United States Patent [19]

Carlsson et al.

[11] 4,119,158

[45] Oct. 10, 1978

[54] ADJUSTABLE TIP FOR PLOUGH SHARE

[75] Inventors: Erik Herbert Carlsson; John Axel Karlsson, both of Overum, Sweden

[73] Assignee: Aktiebolaget Overums Bruk, Overum, Sweden

[21] Appl. No.: 794,758

[22] Filed: May 9, 1977

[30] Foreign Application Priority Data

May 14, 1976 [SE] Sweden ................ 7605524

[51] Int. Cl.² ............................................ A01B 15/04
[52] U.S. Cl. ..................................... 172/704; 172/735
[58] Field of Search ............... 172/719, 737, 761, 759, 172/754, 735, 703, 704

[56] References Cited

U.S. PATENT DOCUMENTS

| 13 | 9/1838 | Woodcock | 172/735 |
| 970 | 10/1838 | Post | 172/735 |
| 397,415 | 2/1889 | Cadwell | 172/761 X |
| 1,230,963 | 6/1917 | Westbrook | 172/737 X |
| 1,576,848 | 3/1926 | Reese | 172/737 X |

FOREIGN PATENT DOCUMENTS

| 535,394 | 1/1957 | Canada | 172/719 |
| 57,238 | 2/1940 | Denmark | 172/719 |
| 467,989 | 11/1928 | Fed. Rep. of Germany | 172/719 |
| 2,118,704 | 11/1971 | Fed. Rep. of Germany | 172/719 |
| 164,570 | 6/1921 | United Kingdom | 172/719 |

Primary Examiner—Richard J. Johnson
Attorney, Agent, or Firm—Alfred E. Miller

[57] ABSTRACT

A plough having a share with an accompanying tip that is removably secured on the bottom front portion of the share. The tip is so constructed and arranged that it is adjustable on the plough share so that the extent of life of use of the tip can be significantly increased. Thus, the maximum use of a plough share tip may be effectuated.

5 Claims, 6 Drawing Figures

ADJUSTABLE TIP FOR PLOUGH SHARE

BACKGROUND OF THE INVENTION

It is known that the working tip of a plough share becomes worn after a period of use. When this occurs, the tip has to be replaced with a new tip. However, arrangements have been devised to lengthen the life of the tip of a plough share. This is done by providing the tip with cutting edges on opposite ends and arranging the tip on the plough share so that it is turnable through 180°. Moreover, arrangements have been proposed in which the front end of a plough share is extended and covered by an exchangeable tip. Thus, when the tip is removed, the front edge itself serves as a tip. It should be evident that none of the foregoing solutions to the problem of lengthening the life of a plough share tip have been completely effective. Thus, the present invention offers a solution in which the maximum use of a plough share tip is effectuated.

It is an object of the present invention to further increase the life of a plough share tip by constructing and arranging the plough share tip and its adjacent plough share in a manner such that it is possible to adjust the tip to several positions on the front bottom part of the plough share. This purpose is achieved in that part of the share, as well as the tip, is provided with at least three fixed connecting points in which at least two points on the plough share are disposed as to coincide with two points on the plough tip to lock the tip in certain distinctive positions so that the tip can be moved to assume at least three different positions.

It is another object of the present invention to permit the orientation of the plough share tip in many positions so that alternate cutting edges can be moved to ground engaging position.

In order that the invention will be more clearly understood, it will now be disclosed in greater detail with reference to the accompanying drawings, in which.

DESCRIPTION OF THE PREFERRED EMBODIMENT

Figure 1:
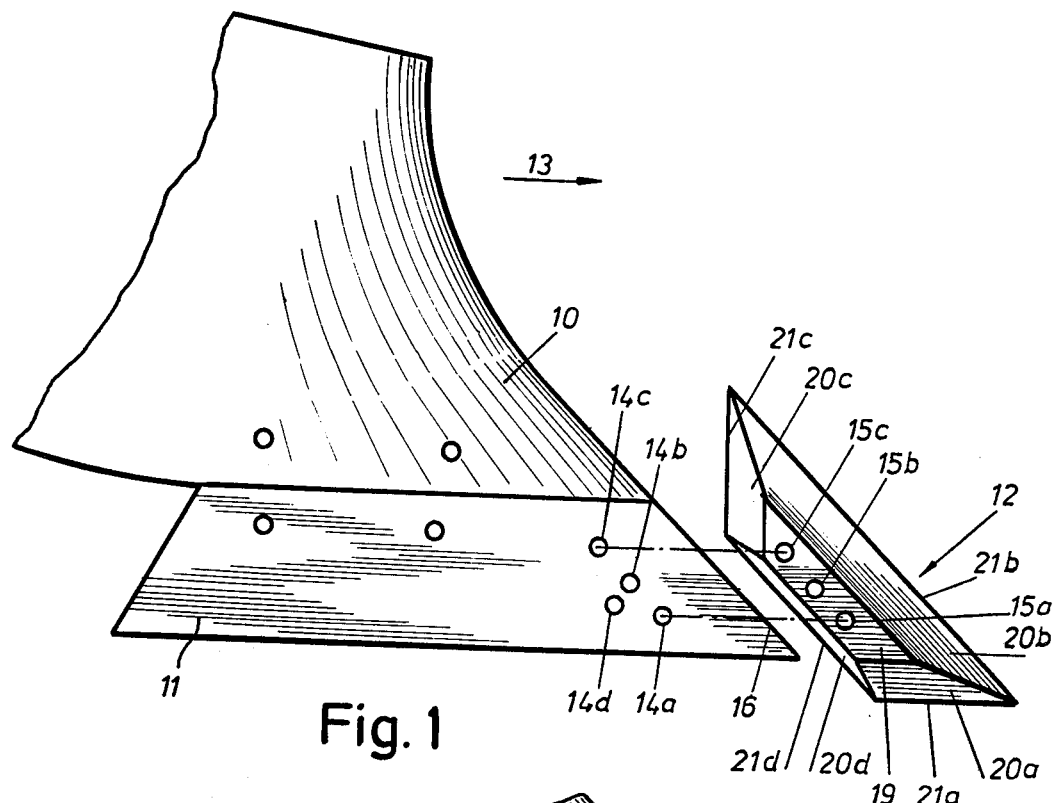
FIG. 1 is a diagrammatic fragmentary view of a plough body and plough share having a removable tip constructed according to the teachings of the invention.

Referring to FIG. 1, a plough body 10 is shown having a share 11 and a tip 12. The tip 12 is mounted on the share 11 by means of bolts (not shown). The arrow 13 indicates the direction of movement of the plough along the ground. Furthermore, it should be noted that the share 11 is provided with four apertures 14a, 14b, 14c and 14d, and that the share tip has three apertures 15a, 15b and 15c. A study of the arrangement will reveal that the apertures of the share 11 and the tip 12 can be caused to overlap each other in such a way that at least two of the apertures of the share 11 can be joined by way of bolts to two tip apertures, to thereby retain said tip 12 on the share 11.

Three apertures 14a, 14b and 14c, as seen in FIG. 1, are located on a line substantially parallel to the front edge 16 of the share 11 and are positioned equal distance from each other. The fourth aperture 14d is located obliquely below the middle aperture 14b at a distance from the aperture 14a that equals the distance respectively between the apertures 14a and 14b.

Figure 5:
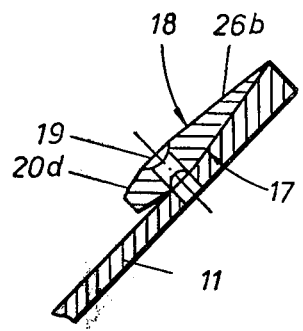
FIG. 5 is a cross-sectional view taken on the lines V—V of FIG. 2.
Figure 6:
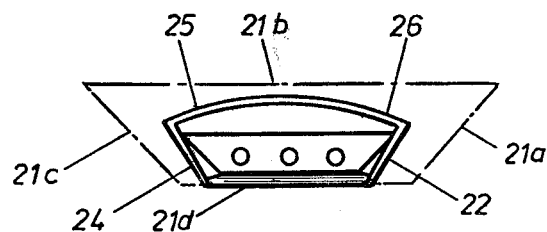
FIG. 6 is an elevational view showing a comparison between a new plough tip and one that has been worn.

It will be seen especially from FIG. 5 that the tip 12 is a prismatic member having two uniform sides 17 and 18. Furthermore, each side has a flat surface 19 and four trapezoidal surfaces 20a, 20b 20c and 20d, which are inclined to the flat surface and end in cutting edges 21a, 21b, 21c and 21d, respectively. In addition, a study of FIG. 1 will show that the flat surfaces 19 are also trapezoidal and have the three apertures 15a, 15b and 15c which are aligned at the same distance from one another as the apertures 14a, 14b and 14c.

Figure 2:
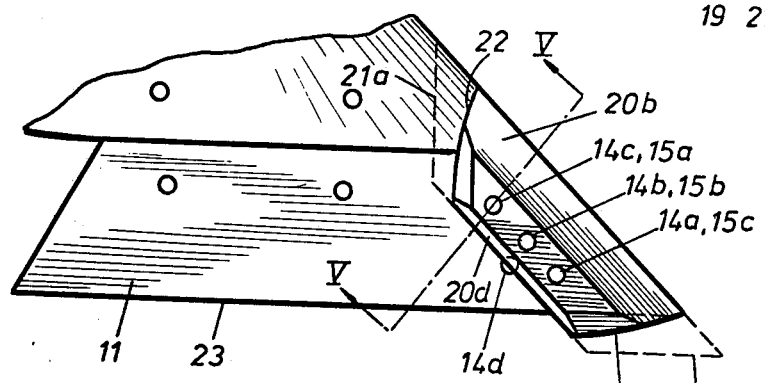
FIGS. 2-4 show the plough tip in different positions on the plough share.
Figure 3:
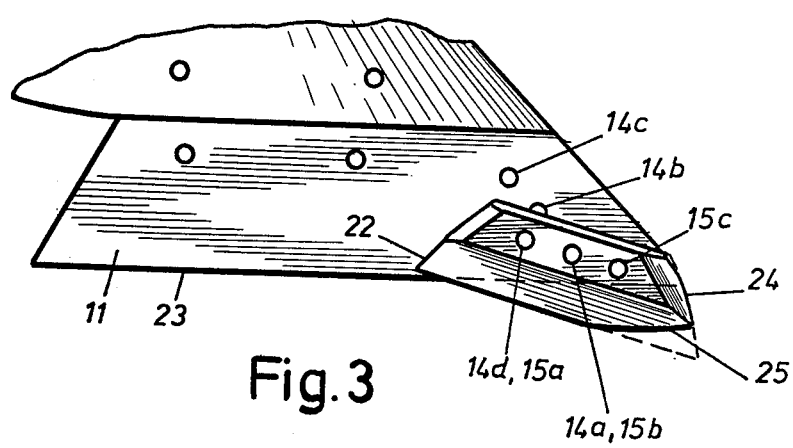
Figure 4:
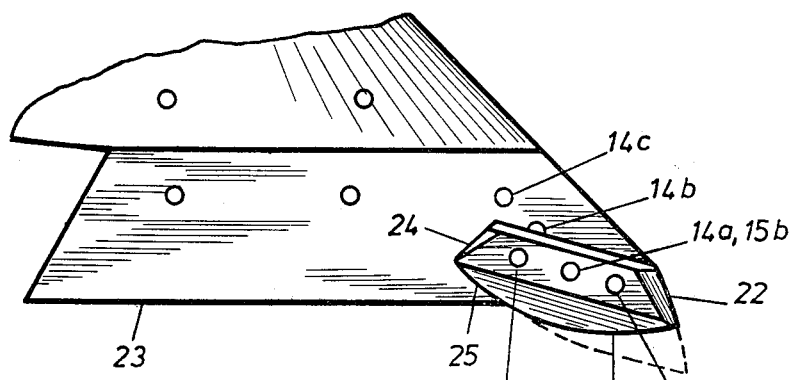

Referring now to FIG. 5, it will be observed that the front edge 16 of the share 11 is comparatively thick while the thickness of the share declines in the direction away from the edge. Therefore, the flat surface of the tip will lie against and abut the share 11 and the cutting edge will continuously sharpen by being ground against the earth. It should be noted, however, that the outer surfaces of the sides 17 and 18 are somewhat curved due to wear. In the position shown in FIG. 1, the tip is arranged to be held by three bolts passing through the apertures 14a, 14b and 14c, respectively, as well as apertures 15a, 15b and 15c, respectively. When the tip 12 has worn to the line 22 of FIG. 2, the tip is turned 180° through a line parallel to the lower edge 23 of the share 11. After this new arrangement, the tip 12 can be worn to the line 24 and this tip is still retained by bolts through the apertures 14a, 14b, 14c, as well as apertures 15a, 15b and 15c. Thereafter the tip 12 is turned with the edge 24 directed forwardly and is moved forward to assume a position somewhat nearer to the horizontal plane, as shown in FIG. 3. The tip 12 is secured by means of the apertures 14a and 14b, as well as apertures 15a, and 15b, after which the tip is worn to a line 25 with the apertures 14c, 14d and 15c not being used. The final adjustment is shown in FIG. 4 in which the tip is turned to assume the position shown therein in which the bolts pass through the apertures 14a and 14b, respectively, 15b and 15c. The tip is worn to the line 26; when this occurs the plough share tip is worn out and must be discarded.

It should be observed that it is within the scope of the present invention to omit either of the apertures 14b or 14d. For example, if the aperture 14b is omitted in the above example, no other difference will ensue other than that the number of attachment points in the positions shown in FIGS. 1 and 2 is reduced from three to two. If the aperture 14d is omitted then the tip can still be changed from the position shown in FIG. 3 to the position shown in FIG. 2. At that time, it is possible to move the tip forwards, downwards and, if desired, to turn it and make the apertures 15b and 15c of the tip coincide with the apertures 14a respectively, 14b of the share 12, whereafter the tip once more can be turned to 180° and the apertures 15a and 15b be made to coincide with the apertures 14a and 14b, respectively.

It should be apparent from the foregoing that it is possible in a rather simple manner to make maximum use of a plough share tip.

What is claimed is:

1. A plough having a share with an adjustable and removable plough tip for attachment to the bottom front portion of said share, comprising at least three fixed points on both said share and said plough tip, at least two points on said share being arranged to align with two points on said plough tip, means co-acting with said points for removably locking said plough tip to said share in a predetermined position, said points being apertures in said share and said plough tip respectively, said apertures in the share and plough tip, when aligned, having said means to lock said share to said plough tip in a selected position, said apertures in said plough tip being in alignment and located equidistant from adjacent apertures, said points on the plough tip having the capability of permitting the peripheral edges of said plough tip to assume a multiplicity of positions on said share, said apertures in said share being arranged whereby the first aperture is located in the outer lower front part of said share, a second aperture being located upwardly and rearwardly from said first aperture and at an angle of approximately 45° to the horizontal plane, and a third aperture being located obliquely below said second aperture, and the distance between said first and second apertures being equal to the distance between the first and third apertures, whereby the entire periphery of said plough tip can be used as a cutting edge.

2. The combination as claimed in claim 1 wherein said share is further provided with a fourth aperture, said fourth aperture being aligned with said first and second apertures at a distance from the second aperture which equals the distance between said first and second apertures.

3. The combination as claimed in claim 1 wherein the width of said share increases in the direction toward said front edge.

4. The combination as claimed in claim 1 wherein said plough tip is prismatic having two uniform sides, each of said sides having a flat surface and four contiguous surfaces inclined thereto, and the ends of said contiguous surfaces which are remote from said flat surface merging into cutting edges, and said flat surfaces of said plough tip having said apertures therein.

5. The combination as claimed in claim 4 wherein there are four separate cutting edges on said plough tip.

* * * * *